United States Patent
Kalker et al.

(10) Patent No.: US 7,109,894 B2
(45) Date of Patent: Sep. 19, 2006

(54) ENCODING AND DECODING A MEDIA SIGNAL WITH HIGH AND LOW QUALITY VERSIONS

(75) Inventors: Antonius Adrianus Cornelis Maria Kalker, Eindhoven (NL); Franciscus Maria Joannes Willems, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/529,664

(22) PCT Filed: Oct. 2, 2003

(86) PCT No.: PCT/IB03/04344

§ 371 (c)(1),
(2), (4) Date: Mar. 29, 2005

(87) PCT Pub. No.: WO2004/032520

PCT Pub. Date: Apr. 15, 2004

(65) Prior Publication Data

US 2006/0033645 A1    Feb. 16, 2006

(30) Foreign Application Priority Data

Oct. 3, 2002  (EP)  .................................. 02079154

(51) Int. Cl.
- H03M 7/34 (2006.01)
- H03M 7/38 (2006.01)
- H04N 7/167 (2006.01)
- H04L 9/00 (2006.01)

(52) U.S. Cl. .......................... 341/51; 380/210; 713/176
(58) Field of Classification Search .................. 341/51; 369/53.37; 375/240.12, 240.02, 240.05, 375/240.11, 225; 382/166, 232, 240; 704/222; 324/121 R; 370/349, 395.1; 380/210; 713/176
See application file for complete search history.

(56) References Cited

U.S. PATENT DOCUMENTS

| | | | | | |
|---|---|---|---|---|---|
| 4,745,474 | A | * | 5/1988 | Schiff | ..................... 375/240.05 |
| 5,173,900 | A | * | 12/1992 | Miller et al. | ................. 370/349 |
| 5,253,058 | A | * | 10/1993 | Gharavi | ................. 375/240.12 |
| 5,287,374 | A | * | 2/1994 | Parr | ............................ 714/774 |
| 5,446,371 | A | * | 8/1995 | Eccleston et al. | ........ 324/121 R |
| 5,459,514 | A | * | 10/1995 | Sakamoto et al. | ..... 375/240.11 |
| 5,487,128 | A | * | 1/1996 | Ozawa | ........................ 704/222 |
| 5,557,318 | A | * | 9/1996 | Gabri el | ....................... 725/93 |
| 5,589,993 | A | * | 12/1996 | Naimpally | .................... 386/81 |
| 5,751,856 | A | * | 5/1998 | Hirabayashi | ................. 382/232 |
| 6,091,855 | A | * | 7/2000 | Hosaka et al. | .............. 382/240 |
| 6,141,299 | A | * | 10/2000 | Utsumi | .................... 369/53.37 |
| 6,289,455 | B1 | * | 9/2001 | Kocher et al. | .............. 713/194 |
| 6,850,021 | B1 | * | 2/2005 | Golownia et al. | .......... 318/432 |

(Continued)

*Primary Examiner*—Patrick Wamsley
(74) *Attorney, Agent, or Firm*—Larry Liberchuk

(57) ABSTRACT

The invention discloses a method of embedding information for high quality restoration of a media signal (typically an audio-visual signal) in a lower quality version of the signal. To this end, the signal x is encoded using a high quality encoder (Q2). The code sequences z produced by the high quality encoder are mapped into code sequences y that are associated with a hypothetical lower quality encoder (Q1). The latter code sequences y are transmitted. A simple decoder will decode the received sequences y, and thus reproduce a low quality version of the signal. A more sophisticated decoder is arranged to inversely map the received code sequences y into the code sequences z, that were actually produced by the high quality encoder (Q2). The sophisticated decoder will thus reproduce a higher quality version of the same signal.

14 Claims, 1 Drawing Sheet

U.S. PATENT DOCUMENTS 6,865,291 B1 * 3/2005 Zador .................... 382/166
6,944,160 B1 * 9/2005 Weiss et al. ............ 370/395.1
6,952,443 B1 * 10/2005 Kong et al. ................ 375/225
7,016,409 B1 * 3/2006 Unger .................. 375/240.02

* cited by examiner

ENCODING AND DECODING A MEDIA SIGNAL WITH HIGH AND LOW QUALITY VERSIONS

FIELD OF THE INVENTION

The invention relates to methods and arrangements for encoding and decoding a media signal, typically an audio-visual signal.

BACKGROUND OF THE INVENTION

One of the proposed methods for Digital Rights Management (DRM) of high quality audio content involves making only low quality versions available to unlicensed users. Licensed users however are provided with some additional information, typically a cryptographic key, that allows them access to an additional quality layer, so as to obtain the original high quality content. Typically the additional quality layer is provided as a separate and encrypted bitstream, i.e. separate from the low quality bit stream. An example of such a dual layer quality approach can be found in the DRM methods being proposed for DVD-Audio.

The presence of two separate bit streams poses a security risk because the encrypted high quality layer is easily traceable, and therefore accessible for cryptographic attacks. For example, by playing out the high quality layer of DVD-Audio, an attacker can try to exploit the observed relation between the encrypted and decrypted bit streams for retrieving cryptographic keys.

OBJECT AND SUMMARY OF THE INVENTION

It is an object of the invention to provide an alternative method of encoding a media signal, and a corresponding method of decoding the encoded media signal. To this end, the invention provides methods and arrangements as defined in the independent claims. Advantageous embodiments are defined in the dependent claims.

The encoding method comprises a step of defining a range of code sequences that are generated by a first encoder in response to encoding respective groups of one or more media signal samples by said first encoder. Note that the media signal is not actually encoded with the first encoder. The step provides the collection of code sequences that can be produced by such an encoder. Preferably, the first encoder is a relatively simple encoder, the code sequences of which can easily be decoded. An example thereof is a scalar quantizer.

The media signal is actually encoded with a different second encoder, which produces second code sequences. Preferably, the second encoder is a high quality encoder, which requires a more complex decoder to decode the media signal. An example thereof is a vector quantizer.

The invention now provides that a selected one of the first code sequences is assigned to each actually produced second code sequence. This assignment is carried out in accordance with a mapping table. The thus assigned first code sequences are transmitted.

With the invention is achieved that receivers having a first decoder, which performs the inverse operation of the first encoder, will decode the received first code sequences and reproduce the encoded media signal with a given quality. More sophisticated receivers having a second decoder, which performs the inverse operation of the second encoder, however, will be able to reconstruct the second code sequences from the received first code sequences, and reproduce the media signal with a different, better, quality.

By the invention, a low quality and high quality layer are multiplexed into a single bitstream. This is done in such a way that the multiplexed bitstream has some distortion with respect to the low quality layer. The high quality layer is embedded in this distortion of the low quality layer and can be made available by providing a proper decoder. In other words, information for high quality restoration has been embedded in a lower quality signal. The inventors have provided theoretical bounds (not described here) that can be achieved with respect to distortion and rates. A possible application is in the field of electronic media delivery. The invention allows a single version of a music song or movie to be distributed to free low quality players as well as high quality players for which a paid license is required.

BRIEF DESCRIPTION OF THE DRAWINGS

These and other aspects of the invention are apparent from and will hereinafter be elucidated, by way of non-limitative examples. In the drawings.

DESCRIPTION OF EMBODIMENTS

It will be assumed hereinafter that the media signal x has samples in a range [0,1). When such a signal x is replaced by another signal x' by a quantizing operation, a distortion $D(x,x')$ is introduced, which is defined by the following equation:

$$D(x, x') = \min\{(x'-x+1)^2, (x'-x)^2, (x'-x-1)^2\}$$

Figure 1:
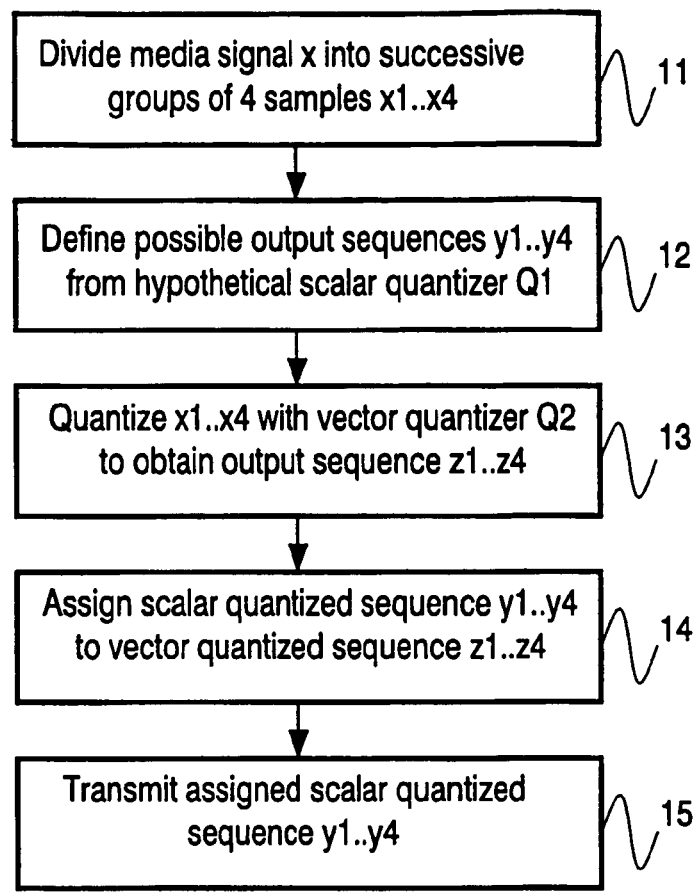
FIG. 1 shows schematically a flow diagram of an illustrative embodiment of the encoding method according to the invention.

FIG. 1 shows schematically a flow diagram of an illustrative embodiment of the encoding method according to the invention. In a step 11 of the method, the media signal x is divided in successive groups of N signal samples $x_1 \ldots x_N$. In this example, N will be assumed to have the value N=4. In a step 12, a range of code sequences $y_1 \ldots y_4$ is defined that could be generated by a scalar quantizer Q1, if such a scalar quantizer was indeed used to quantize a group of samples $x_1 \ldots x_4$ of the media signal x. The scalar quantizer Q1 quantizes each sample x to either y=¼ for x<½ or y=¾ for x≧½. The following Table I lists the 16 possible code sequences $y_1 \ldots y_4$ that can be produced by the (hypothetical) scalar quantizer Q1. For convenience, an index j is assigned to each code sequence. The index j is commonly referred to as quantization index.

TABLE I

| j | $y_1$ | $y_2$ | $y_3$ | $y_4$ |
|---|---|---|---|---|
| 0 | ¼ | ¼ | ¼ | ¼ |
| 1 | ¼ | ¼ | ¼ | ¾ |
| 2 | ¼ | ¼ | ¾ | ¼ |
| 3 | ¼ | ¼ | ¾ | ¾ |
| 4 | ¼ | ¾ | ¼ | ¼ |
| 5 | ¼ | ¾ | ¼ | ¾ |
| 6 | ¼ | ¾ | ¾ | ¼ |

TABLE I-continued

| j | $y_1$ | $y_2$ | $y_3$ | $y_4$ |
|---|---|---|---|---|
| 7 | 1/4 | 3/4 | 3/4 | 3/4 |
| 8 | 3/4 | 1/4 | 1/4 | 1/4 |
| 9 | 3/4 | 1/4 | 1/4 | 3/4 |
| 10 | 3/4 | 1/4 | 3/4 | 1/4 |
| 11 | 3/4 | 1/4 | 3/4 | 3/4 |
| 12 | 3/4 | 3/4 | 1/4 | 1/4 |
| 13 | 3/4 | 3/4 | 1/4 | 3/4 |

TABLE I-continued

| j | $y_1$ | $y_2$ | $y_3$ | $y_4$ |
|---|---|---|---|---|
| 14 | 3/4 | 3/4 | 3/4 | 1/4 |
| 15 | 3/4 | 3/4 | 3/4 | 3/4 |

The distortion that is induced by the scalar quantizer Q1 is D(x,y)=0.0208. The quantizer's rate is R=1 bit per sample.

In a step 13, the media signal x is actually quantized by a vector quantizer Q2. The vector quantizer Q2 divides the 4-dimensional space spanned by four input samples $x_1 \ldots x_4$ into sixteen subspaces, and assigns a code sequence of four quantized signal samples $z_1 \ldots z_4$ to each subspace. In this example, the vector quantizer produces quantized sample values z=1/8, z=3/8, z=5/8, or z=7/8. Individual signal samples can thus more precisely be quantized than with the scalar quantizer. However, only 16 combinations of quantized signal samples are chosen, so that the rate of the vector quantizer is equal to the rate of the hypothetical scalar quantizer.

The following Table II lists the 16 possible code sequences $z_1 \ldots z_4$ that can be produced by the vector quantizer Q2. Again, an index (now denoted i) is assigned to each code sequence.

TABLE II

| i | $z_1$ | $z_2$ | $z_3$ | $z_4$ |
|---|---|---|---|---|
| 0 | 1/8 | 1/8 | 1/8 | 1/8 |
| 1 | 1/8 | 3/8 | 5/8 | 7/8 |
| 2 | 1/8 | 7/8 | 5/8 | 3/8 |
| 3 | 1/8 | 5/8 | 1/8 | 5/8 |
| 4 | 3/8 | 1/8 | 7/8 | 5/8 |
| 5 | 3/8 | 3/8 | 3/8 | 3/8 |
| 6 | 3/8 | 7/8 | 3/8 | 7/8 |
| 7 | 3/8 | 5/8 | 7/8 | 1/8 |
| 8 | 7/8 | 1/8 | 3/8 | 5/8 |
| 9 | 7/8 | 3/8 | 7/8 | 3/8 |
| 10 | 7/8 | 7/8 | 7/8 | 7/8 |
| 11 | 7/8 | 5/8 | 3/8 | 1/8 |
| 12 | 5/8 | 1/8 | 5/8 | 1/8 |
| 13 | 5/8 | 3/8 | 1/8 | 7/8 |
| 14 | 5/8 | 7/8 | 1/8 | 3/8 |
| 15 | 5/8 | 5/8 | 5/8 | 5/8 |

The distortion that is induced by the vector quantizer Q2 is D(x,z)=0.0197. Note that the improvement over the scalar quantizer Q1 is not very large, only 0.25 dB. The quantizer's rate is again R=1 bit per sample.

The salient feature of the invention resides in a step 14, which is carried out after actually quantizing a group of signal samples with the vector quantizer Q2. In the step 14, a selected one of the "scalar quantized" code sequences $y_1 \ldots y_4$ (Table I) is assigned to each "vector quantized" code sequence $z_1 \ldots z_4$ (Table II). The assignment is carried out in accordance with a reordering mapping function j=m (i). Table III shows the reordering mapping used in the present example.

TABLE III

| | i | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| j = m(i) | 0 | 1 | 6 | 5 | 3 | 2 | 4 | 7 | 9 | 10 | 15 | 12 | 8 | 11 | 13 | 14 |

Instead of transmitting an actually obtained "vector quantized" code sequence with index i (Table II), a "scalar quantized" code sequence with index j (Table I) is now transmitted in a step 15. For example, a particular input sequence x1, which is vector quantized as z=[3/8, 1/8, 7/8, 5/8] (index i=4), is transmitted as scalar quantized sequence y=[1/4, 1/4, 3/4, 3/4] (index j=3). Another input sequence x2, which is vector quantized as z=[1/8, 3/8, 5/8, 7/8] (index i=1) will be transmitted as scalar quantized sequence y=[1/4, 1/4, 1/4, 3/4] (index j=1).

A simple receiver having a scalar dequantizer will reproduce the scalar quantized signal sequence $y_1 \ldots y_4$. The above mentioned input sequences x1 and x2 will thus be reproduced as [1/4, 1/4, 3/4, 3/4] and [1/4, 1/4, 1/4, 3/4], respectively. Note that if the media signal x was actually quantized with the scalar quantizer Q1, both sequences x1 and x2 would probably have been quantized as y=[1/4, 1/4, 3/4, 3/4]. The distortion between the input signal and the reconstructed signal of a simple receiver is thus larger than the distortion D(x,y)=0.0208 of scalar quantizer Q1. The reordering mapping function j=m(i) is preferably chosen such that the distortion D(x,y) between $x_1 \ldots x_4$ and $y_1 \ldots y_4$ is as small as possible. The reordering mapping function, which is shown in Table III, has been found to yield a distortion D(x,y)≈0.0473.

Figure 2:
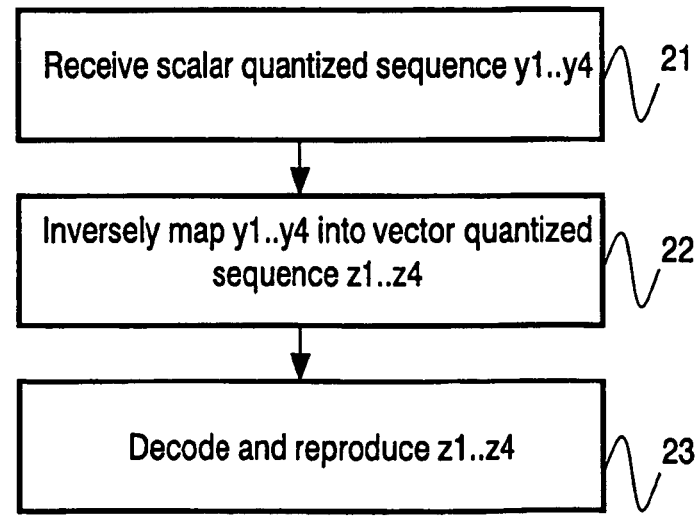
FIG. 2 shows schematically a flow diagram of an illustrative embodiment of the decoding method according to the invention.

A more sophisticated receiver comprises a vector dequantizer to reproduce the media signal. FIG. 2 shows schematically a flow diagram of an illustrative embodiment of the decoding method according to the invention. In a step 21, a scalar-quantized sequence $y_1 \ldots y_4$ is received. In a step 22, the received sequence is inversely mapped into the vector quantized sequence $z_1 \ldots z_4$. This inverse reordering mapping is carried out in accordance with the inverse reordering mapping function $i=m^-(j)$ (see Table III) In a step 23, the sequence $z_1 \ldots z_4$ is decoded and reproduced. It will be appreciated that the above mentioned exemplary sequences x1 and x2 will now be reproduced as [3/8, 1/8, 7/8, 5/8] and [1/8, 3/8, 5/8, 7/8], respectively. The distortion between input signal and reconstructed signal is now D(x,z)=0.0197. The signal quality of the sophisticated receiver is thus considerably better than the signal quality of the simple receiver. Generally, the sophisticated receiver is more complex.

The reordering mapping function (Table III) in combination with the assignment of indexes (i,j) to quantized sequences (Tables I and II) constitutes a mapping table, that assigns relations between scalar quantized sequences and vector quantized sequences. It will be appreciated that the indexes may alternatively be assigned such that the reordering function j=m(i) is superfluous. This applies particularly to index i, the assignment of which is quite arbitrary. Using a reordering function j=m(i), however, has the advantage that the function can be kept secret to unlicensed users, even if they have the sophisticated version of the receiver at their disposal.

The above described example of an embodiment of the invention using a simple scalar quantizer Q1 and a more sophisticated vector quantizer Q2 having the same rate shows the operation and advantageous effects of the invention. As has been described, a source X is quantized with a high quality quantizer Q2. That means that every coding vector of X is approximated by a vector q2($i$), for some index i. As Q1 and Q2 have the same number of coding vectors, it is possible to find a reordering j=m(i) such that q1($j$) is also an approximation to x, although in general of less quality. An unlicensed user is given a set of indices j with respect to the scalar quantizer Q1. He will be able to reconstruct a low quality approximation to X. A licensed user will have access to the code vectors in Q2 as well as the inverse of the reordering map m(i) and will therefore be able to reconstruct a better approximation to X.

More generally summarized, the invention discloses a method of embedding information for high quality restoration of a media signal (typically an audio-visual signal) in a lower quality version of the signal. To this end, the signal x is encoded using a high quality encoder (Q2). The code sequences z produced by the high quality encoder are mapped into code sequences y that are associated with a hypothetical lower quality encoder (Q1). The latter code sequences y are transmitted. A simple decoder will decode the received sequences y, and thus reproduce a low quality version of the signal. A more sophisticated decoder is arranged to inversely map the received code sequences y into the code sequences z, that were actually produced by the high quality encoder (Q2). The sophisticated decoder will thus reproduce a higher quality version of the same signal.

Although the invention has been described with reference to particular illustrative embodiments, variants and modifications are possible within the scope of the inventive concept. Thus, for example, the use of the verb 'to comprise' and its conjugations does not exclude the presence of elements or steps other than those defined in a claim. In the claims, any reference signs placed between parentheses shall not be construed as limiting the claim. The invention can be implemented by means of hardware comprising several distinct elements, and by means of a suitably programmed computer. Some of the features indicated in the drawings are typically implemented in software, and as such represent software entities, such as software modules or objects. A 'computer program' is to be understood to mean any software product stored on a computer-readable medium, such as a floppy-disk, downloadable via a network, such as the Internet, or marketable in any other manner.

The invention claimed is:

1. A method of encoding a media signal, comprising:
defining a range of first code sequences that are generated by a first hypothetical encoder in response to encoding respective groups of one or more media signal samples by said first hypothetical encoder without encoding the groups of media signal samples,
using a second encoder for actually encoding the groups of media signal samples into second code sequences,
assigning to each second code sequence a selected one of said first code sequences in accordance with a mapping table, and
transmitting the selected first code sequences to represent the information signal.

2. A method as claimed in claim 1, wherein the first and second encoders are quantizers, and the respective first and second code sequences are quantized signal samples.

3. A method as claimed in claim 2, wherein the first quantizer is a scalar quantizer and the second quantizer is a vector quantizer.

4. A method as claimed in claim 1, wherein the second encoder has a higher encoding quality than the first encoder.

5. The method as claimed in claim 1, further comprising dividing a media signal into a plurality of media signal samples such that the groups of media signal samples all include a plurality of media signal samples.

6. The method as claimed in claim 1, further comprising assigning an index to the code sequences that would be generated by the first encoder in response to encoding respective groups of one or more media signal samples by said first encoder, the index being used in the mapping table.

7. The method as claimed in claim 1, further comprising setting the rate of the second encoder to be equal to the rate of the first encoder.

8. The method as claimed in claim 1, further comprising selecting the mapping table such that distortion between the media signal samples and the first code sequences is small.

9. An apparatus for encoding a media signal, the apparatus comprising circuitry for:
defining a range of first code sequences that are generated by a first hypothetical encoder in response to encoding respective groups of one or more media signal samples by said first hypothetical encoder without encoding the groups of media signal samples,
encoding the groups of media signal samples into second code sequences using a second encoder,
assigning to each second code sequence a selected one of said first code sequences in accordance with a mapping table, and
enabling transmission of the selected first code sequences to represent the information signal.

10. A method of decoding an encoded information signal, comprising:
receiving first code sequences associated with a first decoder,
enabling decoding of the first code sequences using the first decoder to obtain the information signal having a low encoding quality,
replacing said first code sequences by second code sequences in accordance with a mapping table, and
decoding the second code sequences using a second decoder to obtain the information signal having a higher information quality.

11. A method as claimed in claim 10, herein the first and second code sequences are quantized signal samples, and the respective first and second decoders are first and second inverse quantizers.

12. A method as claimed in claim 11, wherein the first inverse quantizer is an inverse scalar quantizer and the second inverse quantizer is an inverse vector quantizer.

13. The method as claimed in claim 10, further comprising enabling the decoding of the second code sequences only upon licensing of the mapping table.

14. An apparatus for decoding an encoded information signal, the apparatus comprising circuitry for:
  receiving first code sequences associated with a first decoder;
  enabling decoding of the first code sequences using the first decoder to obtain the information signal having a low encoding quality;
  replacing said first code sequences by second code sequences in accordance with a mapping table; and
  decoding the second code sequences using a second decoder to obtain the information signal having a higher information quality.

* * * * *